UNITED STATES PATENT OFFICE.

WILLIAM E. BROCK, OF NEW YORK, N. Y.

IMPROVEMENT IN PAINT COMPOUNDS.

Specification forming part of Letters Patent No. 155,141, dated September 22, 1874; application filed November 25, 1873.

*To all whom it may concern:*

Be it known that I, WM. E. BROCK, of the city, county, and State of New York, have invented a new and Improved Composition for Paint, of which the following is a specification:

This invention relates to the production of a paint that may be applied, as other paints, to the surface of articles or structures of wood or metal, such as table-tops, mantels, ornaments, or to plastered walls, to give them the appearance of stone in any of its varieties; and it consists in the combination of finely-pulverized stone with liquid quartz or a soluble silicate of soda.

In the preparation of this paint I take what is known in commerce as a liquid silicate of soda, and mix with it a sufficient quantity of finely-pulverized stone to give about the consistency of good sirup; then pass the mass through an ordinary paint-mill, to thoroughly amalgamate the two. The paint thus compounded may then be diluted by the addition of carbonic-acid water in the proportion of about three-sixteenths of the latter to one part of the silicate of soda, and to this I add a very small quantity of hydrofluoric acid, which causes the components above mentioned to commingle more thoroughly, so as to be applied with a brush to wood, metal, plaster, cement, or composition, and to give to all such materials the appearance of solid stone.

One or more coats may be applied until sufficient body-surface is obtained; and if a polished surface is desired, a mixture of finely-pulverized stone with a colorless varnish may be used as a finishing-coat; and if a perfectly-even surface is required, each coat, when dry, should be rubbed down with sand-paper, or with a flat stone and water, before applying another.

This composition may be washed without injuring its surface or color, while the ordinary paint will change yellow, either by washing or from age. It is, furthermore, much cheaper than any other paint, and little, if any, more expensive than ordinary whitewash, and can therefore be economically used as a substitute therefor on walls, ceilings, or even as a coating for outdoor fencing, stoops, verandas, window-sills, and cappings, or other analogous purposes. It will keep any length of time in air-tight vessels, simply requiring to be well shaken or stirred before using; but if exposed to the air, it will dry rapidly and assume the appearance of solid stone.

What I claim as new, and desire to secure by Letters Patent, is—

The composition herein described of silicate of soda and finely-pulverized stone, diluted with carbonic-acid water and hydrofluoric acid, in about the proportions herein specified, for the purpose set forth.

WM. E. BROCK.

Witnesses:
W. MORRIS SMITH,
S. M. POOL.